US008281360B2

(12) United States Patent
Flewallen et al.

(10) Patent No.: US 8,281,360 B2
(45) Date of Patent: Oct. 2, 2012

(54) CONTROL OF COMMUNICATION PORTS OF COMPUTING DEVICES USING POLICY-BASED DECISIONS

(76) Inventors: Steven Adams Flewallen, Pleasant Grove, UT (US); David Nephi Johnson, Lindon, UT (US); Lloyd Leon Burch, Payson, UT (US); Benjamin Clark Fjeldsted, Provo, UT (US); David Kent Beus, Highland, UT (US); Thiruvarangam Viswanathan Sriram, Bangalore (IN)

( * ) Notice: Subject to any disclaimer, the term of this patent is extended or adjusted under 35 U.S.C. 154(b) by 1293 days.

(21) Appl. No.: 11/602,721

(22) Filed: Nov. 21, 2006

(65) Prior Publication Data
US 2008/0120691 A1    May 22, 2008

(51) Int. Cl.
  *H04L 29/06* (2006.01)
(52) U.S. Cl. ............ 726/1; 726/12; 709/224; 370/226; 370/244; 370/245
(58) Field of Classification Search .................. None
See application file for complete search history.

(56) References Cited

U.S. PATENT DOCUMENTS

| 5,341,477 | A | 8/1994 | Pitkin et al. | |
| 5,968,176 | A * | 10/1999 | Nessett et al. | 726/11 |
| 6,212,184 | B1 | 4/2001 | Venkatachary et al. | |
| 7,003,561 | B1 | 2/2006 | Magdych et al. | |
| 7,039,641 | B2 | 5/2006 | Woo | |
| 7,047,561 | B1 * | 5/2006 | Lee | 726/12 |
| 7,065,082 | B2 | 6/2006 | Ganesh et al. | |
| 7,099,980 | B1 | 8/2006 | Magnuson et al. | |
| 7,526,541 | B2 * | 4/2009 | Roese et al. | 709/223 |
| 7,546,629 | B2 * | 6/2009 | Albert et al. | 726/1 |
| 2002/0069175 | A1 * | 6/2002 | Burich | 705/52 |
| 2004/0105435 | A1 * | 6/2004 | Morioka | 370/359 |
| 2004/0225883 | A1 * | 11/2004 | Weller et al. | 713/166 |
| 2005/0144557 | A1 * | 6/2005 | Li et al. | 715/513 |
| 2005/0183140 | A1 | 8/2005 | Goddard | |
| 2005/0198200 | A1 | 9/2005 | Subramanian et al. | |
| 2006/0072565 | A1 | 4/2006 | Yazaki et al. | |
| 2008/0034414 | A1 * | 2/2008 | Mao et al. | 726/13 |

OTHER PUBLICATIONS

V. Srinivasan, G. Varghese, S. Suri, M. Waldvogel, "Fast and Scalable Layer Four Switching," Applications, Technologies, Architectures, and Protocols for Computer Communication Proceedings for the ACM SIGCOMM '98 Conference, 1998, pp. 191-202; Vancouver, British Columbia, Canada.

* cited by examiner

*Primary Examiner* — Nathan Flynn
*Assistant Examiner* — Michael R Vaughan
(74) *Attorney, Agent, or Firm* — King & Schickli, PLLC (57) ABSTRACT

In a computing system environment, an arrangement of computing devices includes multiple layers behind a content flow director, such as an L4 switch in a web service. In a computing device of an outermost layer directly communicating with the content flow director, a communications port is conditionally enabled upon policy being met or exceeded in the computing system environment behind the content flow director. If unmet, the communications port is disabled, if already enabled, or prevented from becoming enabled, if not otherwise already enabled. In this manner, policy establishes port enablement. In certain aspects, policy determinations include determining a time of response, a quality of service check or a pass/fail condition of the one of the computing devices. Policy is also easily implemented as remote or local computer executable instructions on the computing devices. Representative computing devices include switches, such as L4 switches, routers, servers, repeaters, adapters or the like.

12 Claims, 11 Drawing Sheets

CONTROL OF COMMUNICATION PORTS OF COMPUTING DEVICES USING POLICY-BASED DECISIONS

FIELD OF THE INVENTION

Generally, the present invention relates to computing devices of computing system environments, such as those involved in transmitting or receiving data packets as in a web service, for instance. Particularly, it relates to methods and apparatus for enabling or disabling ports of interconnected computing devices, especially relative to policy-based decisions. Various features relate to particular policies and to determining the meeting or exceeding of policies. Multiple layers of the environment are also implicated as part of the policy and decision making process. Avoiding altering content flow directors, such as layer four (L4) or other switches, and taking advantage of their typical configuration is another noteworthy feature.

BACKGROUND OF THE INVENTION

A typical web service today is built of many layers of programs and/or computing devices. For instance, an outermost layer is provided that is usually responsible for the socket layer and other communications. One or more intermediate layers exist behind the outermost layer and often control flow or function. In the bottom most layer, most of the business logic is performed. Also, many of the computing devices are placed behind one or more content flow directors, such as a Layer Four (L4) switch, to allow for scalability and fail over. While the layered approach has many advantages, it also creates or avoids fully assessing other problems.

For example, most L4 switches are able to detect whether a port failure has occurred in the computing devices of the outermost layer, to which they are directly connected, and will redirect network traffic to other servers, for example, upon port failure. However, if a problem arises in a layer deeper than the outermost layer, for example, away from the L4 switch, the communications port of the outermost layer will remain fully operational despite the problem. As a result, the L4 will not fail over to other computing devices because its relationship to the outermost communication port has not failed and appears normal.

Accordingly, there is need in the art to assess the health of services that functions deeper than just a check of interfaced ports. While some higher end L4 switches have the capability of testing a full URL path, most cannot. Even those L4 switches that can test full URLs, most only test for very simple HTTP status codes. Accordingly, there is a further need in the art to perform checks more robustly, such as by way of policy-based decisions. Naturally, any improvements should further contemplate good engineering practices, such as relative inexpensiveness, stability, ease of implementation, low complexity, etc. In this regard, implementation of invention without reconfiguring or altering typical configurations of the L4 switches or other content flow directors remains another need in the art.

SUMMARY OF THE INVENTION

The above-mentioned and other problems become solved by applying the principles and teachings associated with the hereinafter-described control of communication ports of computing devices by way of policy-based decisions. At a basic level, the invention provides apparatus and methods to inform content flow directors, such as L4 switches, that one of the processes of the web service has failed or become sick. Representatively, this occurs by establishing a policy that layers away from the interface of the director must meet or the port of the front end process, e.g., the outermost layer directly communicating with the director, will be shut down or never turned on or enabled. In other words, the simple rule of "if the port is down do not send traffic to it" is leveraged to allow complex policies to be implemented and followed. During port down times, the director will send all traffic to other services. Conversely, when the port is operational, traffic will go to the service, as normal. In turn, a typical content flow director is leveraged without necessarily being modified.

In a representative implementation, a computing system environment contemplates arrangement of computing devices, such as multiple layers behind a content flow director, such as an L4 switch in a web service. In a computing device of an outermost layer directly communicating with the content flow director, a communications port is conditionally enabled upon policy being met or exceeded in the computing system environment behind the content flow director. If unmet, the communications port is disabled, if already enabled, or prevented from becoming enabled, if not otherwise already enabled. In this manner, policy establishes port enablement. Certain representative policy determinations include determining a time of response, a quality of service check or a pass/fail condition of the one of the computing devices in the layers behind the director. Policy is also easily implemented as remote or local computer executable instructions on one or more of the computing devices. Representative computing devices include switches, routers, servers, repeaters, adapters or the like.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for controlling communication ports of computing devices by way of policy-based decisions are hereinafter described.

Figure 1:
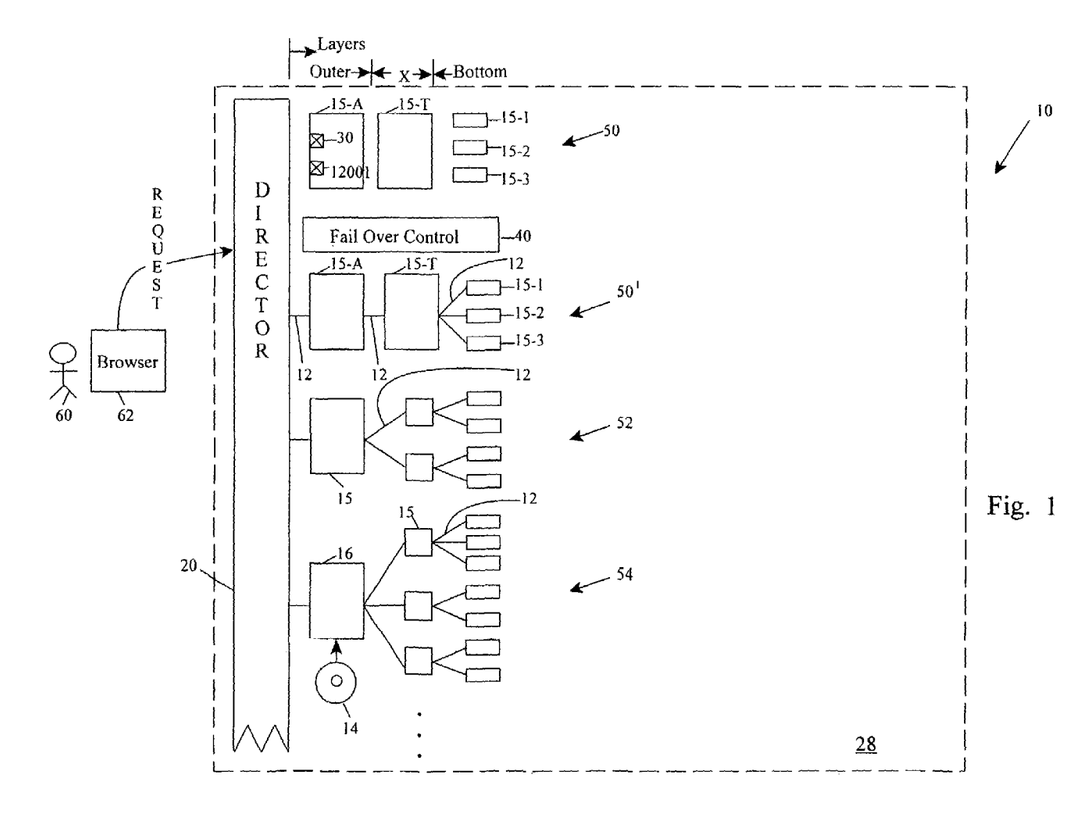
FIG. 1 is a diagrammatic view in accordance with the present invention of a representative computing system environment having a content flow director arranged to communicate with multiple layers, such as in a cluster of web servers.

With reference to FIG. 1, a representative computing environment incorporating communication port control is given generically as 10. In a traditional sense, the environment includes one or more programs or computing devices 15 (to prevent overcrowding in the figure, only a few reference numerals 15 are labeled) available in layers, such as an outer, bottom or one or more intermediate X layers, behind a content flow director 20, such as in a web server cluster 28. To this end, a policy is established in one or more of the layers behind the director, such that a communications port 30 of a computing device in the outermost layer interfacing with the director will be conditionally enabled to communicate with the director upon the meeting or exceeding of the policy. On the other hand, failing the policy will prevent enabling the port or disabling an otherwise enabled port. Among other things, policies will be shown to be items such as a time of response, a quality of service check or a pass/fail condition of one of the computing devices in the layers behind the director. Policy is also easily, and representatively, implemented as remote or local computer executable instructions on one or more of the computing devices, given generally as a fail over control 40.

Before then, however, exemplary directors and computing devices typify switches (e.g., L4 or other), routers, servers (e.g., blade, grid or other), general or special purpose computers, etc. Per each of the foregoing, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., software, as part of tangible computer readable media, e.g., disk 14 for insertion in a drive of device 16. Computer executable instructions may also reside in hardware, firmware or combinations in any or all of the depicted devices or be available as downloads from one or more other devices.

When described in the context of computer readable media, it is denoted that items thereof, such as modules, routines, programs, objects, components, data structures, etc., perform particular tasks or implement particular abstract data types within various structures of the computing system which cause a certain function or group of functions. In form, the computer readable media can be any available media, such as RAM, ROM, EEPROM, CD-ROM, DVD, or other optical disk storage devices, magnetic disk storage devices, floppy disks, or any other medium which can be used to store the items thereof and which can be assessed in the environment.

In network, the computing devices communicate with one another via wired, wireless or combined connections 12 (for simplicity, only a few are given numerals) that are either direct or indirect. If direct, they typify connections within physical or network proximity (e.g., intranet) or as internal layers of an individual device. If indirect, they typify connections such as those found with the Internet, satellites, radio transmissions, or the like. In this regard, other contemplated items include peer devices, modems, T1 lines, satellites, microwave relays or the like. The connections may also be local area networks (LAN) and/or wide area networks (WAN) that are presented by way of example and not limitation.

The topology is also any of a variety, such as ring, star, bridged, cascaded, meshed, or other known or hereinafter invented arrangement. For illustration, a first topology 50 and a fail over topology 50' include one or more computing devices or programs 15 connected in an outer, bottom and intermediate X layer behind the content flow director 20. In the outer layer, a representative device is that of an Apache web server 15-A having a communication port 30, such as a public port having common numerology 443. At present, the port of topology 50 is disabled or un-enabled, as indicated by the symbol of a square with an X located therein, and prevented from communications with the director. In the intermediate X layer, a Tomcat servlet engine 15-T resides. In the bottom layer, three applications exist 15-1, 15-2, and 15-3, and representatively embody a support, a development and an administrative application. In all, the three layers communicate with one another behind the director 20. The director, on the other hand, is responsive to requests, such as from an end user 60 by way of a browser 62, as is well known. In the event the topology is properly working, requests are fulfilled and funneled back to the end user from the one or more applications 15-1, 15-2, 15-3, by way of the intermediate and outer layers, and by way of the director 20, as is also well known. In the event the topology is not properly working, the director directs traffic to a fail over topology. Also, alternate embodiments contemplate the layers as topologies such as 52 or 54, combinations thereof, or other known or hereafter invented arrangements as represented by the ellipses. As an illustration only, 52 and 54 show the outer layer as before, but alter the numerosity and connections of the intermediate and bottom layers. Of course, the present invention is not limited by any one precise arrangement.

Rather, the fail over control 40 is loaded on one or more of the devices that run the services in need of having policy driven fail over. When the outer layer service (Apache web server in this example) is started, it is configured to allow two ports or IP addresses, for example. Representatively, port 30 is defined as the public port while port 12001 is the private port. The public port, however, is not enabled at the time of startup and is conditionally enabled relative to policy determinations.

Continuing, when the fail over control starts, it reads its policy. The policy, in turn, defines what condition(s) should be tested and what the correct response(s) should be. The policy can check any of the processes running behind the outer process. This can be done by issuing URL request, checking the current status of running process, or anything else on the device that policy has defined. When the policy is testing URL access by way of the private port of the outer resource will be used. This is because the public port is not enabled yet. The invention may also check outside resources as defined by the policy it is using.

Ultimately, the response from these requests will be evaluated by policy to determine if the policy requirements have been met. This may be a simple pass/fail or may be a quality of service check. Time to respond and other factors may also be part of the policy requirements. If these policy criteria or base conditions are met, the fail over enables the public port on the on the outer service to allow future communications from the director. When the port is enabled, the director will detect that the port is operational according to its typical configuration and will begin to send data traffic to the outer service. This traffic will then use the middle (intermediate) and back end or bottom services (in this example, the Tomcat servlet and the applications). Over time, the process will repeat.

Figure 2:
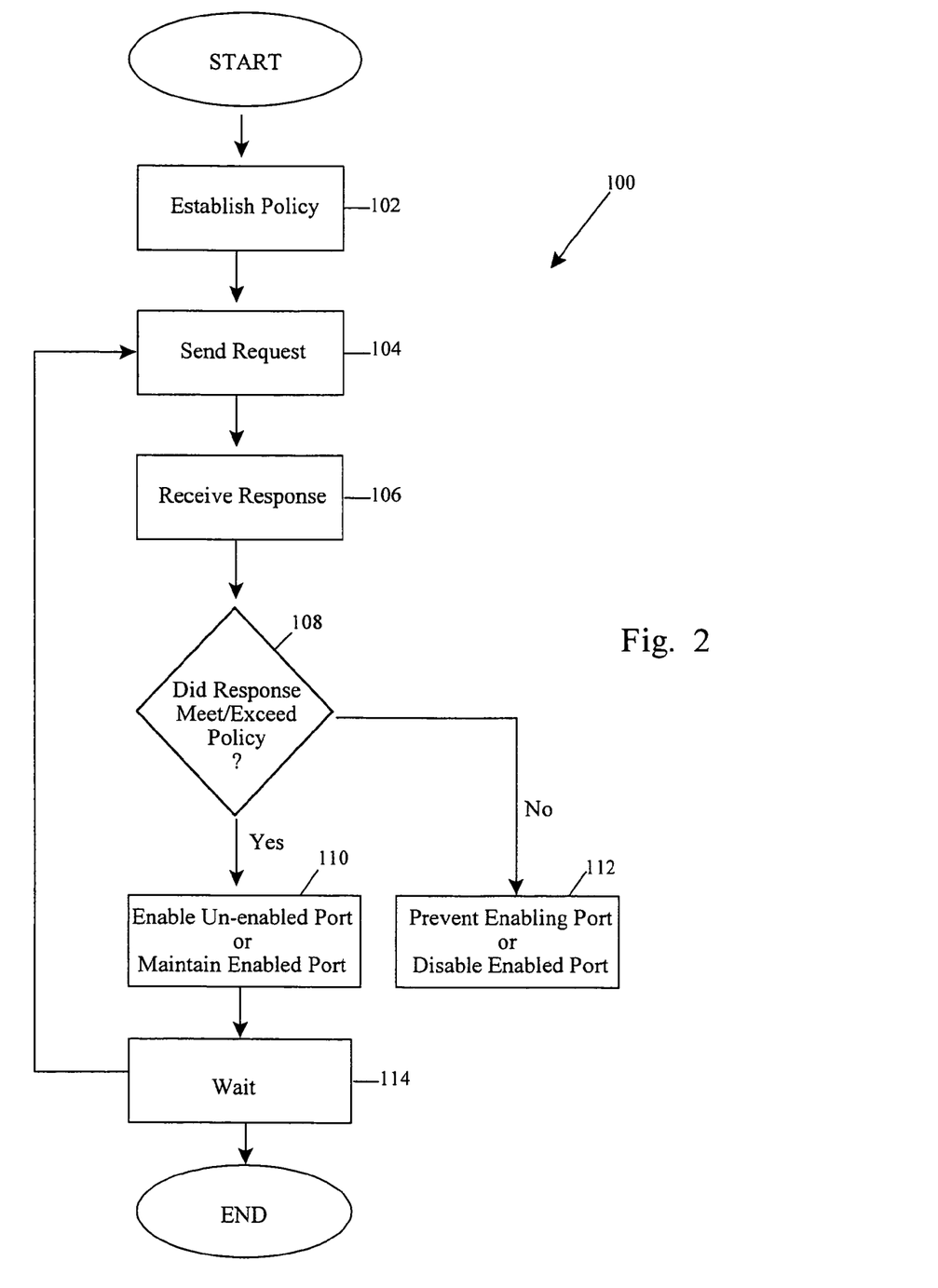
FIG. 2 is a flow chart in accordance with the present invention of a representative method for controlling one or more communication ports in the representative environment of FIG. 1 based upon policy decisions.

With more specificity, FIG. 2 depicts a flow chart 100 indicating the foregoing representative communication port control. For instance, at step 102 the policy for the one or more devices behind the content flow director is established. As before, it embodies code found locally or remotely with one or more of the devices in need of having established policy. It can be also any of a variety of policies and such is representatively set by way of an administrative role acting with the devices. Representative policies herein include, but are not limited to, a time of response, a quality of service check or a pass/fail condition of the one of the computing devices. The policy may also include an acceptable response based upon a predetermined criteria for same. For instance, a time of response might be set as acceptable if being less than a given number of nanoseconds, being above a specified percentage for quality of service, or a specific percentage of a larger transaction. Still others contemplate a response from the service of 504 (or 404) thereby indicating that the service needs shutting off, while a response of 200 would indicate the need of service activation. A line in a log file for the service that representatively says "INFO: Starting Coyote HTTP/1.1 on http-8443" could be used to signal that the service needs to be activated, whereas a log event of "INFO: Stopping Coyote HTTP/1.1 on http-8443" would indicate that the service needs to be deactivated.

At step 104, policy is then applied to one or more layers of devices behind the director. In this regard, an interrogation or a request is sent relating to the policy. For instance, if quality of service check is the relevant policy, the fail over control may query or interrogate a device on its quality of service score. Also, the fail over control may perform the act of sending or simply initiate it so that another structure or executable instruction causes it to be sent. The fail over control will also likely cause the request to be sent directly or indirectly to a device at a layer deeper than the outermost layer. In this regard, it is desired to test the health of a service, for example, and simply knowing whether an outermost layer is operable relative to a director is oftentimes insufficient at testing the system. Thus, the request is sent to one or more devices of layers, especially at the intermediate or bottom layer. At step 106, the device under consideration in one of these layers would return its response.

From there, at step 108, the response is evaluated to determine whether it meets or exceeds the established policy. If met, step 110, an otherwise un-enabled communications port, especially of the outermost layer, becomes enabled so that future communications with the director can be established. In that the director, such as an L4 switch, regular assesses whether downstream ports are operational, this then avoids having to reconfigure the director. To the extent the communications port was already operational, the port remains enabled or operational. On the other hand, if the response does not meet the policy, step 112, a port of a device, especially of the outermost layer, is prevented from being enabled. In this manner, no communications between the director and the layers exist and the director can send traffic elsewhere. To the extent the communications port was already operational when it was discovered that policy was unmet, the enabled port is disabled to prevent future communications. In other words, the port of the computing device is conditionally enabled relative to the policy determination being unmet or met or exceeded.

Further, the evaluation of the policy relative to a response can be effectuated by the fail over control or other software or hardware items. In a representative embodiment, the fail over control will compare the response directly to a predetermined acceptable response and then either enable an un-enabled port, if policy is met or exceeded, or prevent enabling of an un-enabled port, if policy is unmet. Also, the evaluation of responses relative to policy could be of any format suitable for expressing value and judging an acceptable response relative thereto. In this regard, a grading scale (e.g., A±, B±, C±, D±, F), a spectrum (e.g., a scale ranging from terrible to excellent), a time, a quality of service check, etc. are contemplated. The policy can also typify an objective measure, a subjective measure or both. It can also be based on an adaptive process that changes negatively or positively over time. In this regard, an initialized policy in the absence of any quantifiable criteria, for example, may be initialized to some neutral starting point, such as zero.

Regardless, to the extent policy was either met or unmet at step 108, step 114 further contemplates iterating the process to continually enforce the policies established. That is, a wait of some sort is effectuated and the process of sending another request 104, receiving a response 106 and evaluating the response relative to the established policy 108 is repeated as often as desired. In a representative embodiment, a wait of a few seconds occurs before proceeding to send another request at step 104. Alternatively, an indefinite wait occurs until an external event inquires of whether policy is being met. For instance, a logging event may be combined with the evaluation of policy to enable, or not, ports of computing devices to build a cumulative record of events. By coupling the logging event to a messaging event, a message could trigger a process whereby further evaluation at step 104 begins. Thus, a wait can be internal or external to the fail over, it can be based on time or other objective criteria or on a subjective criteria as desired. Appreciating the wait step 114 creates the possibility of an infinite loop, the process of evaluating policy to ultimately control a communications port of a computing device can also occur infinitely. The process may also stop if desirable, at which time the wait step 114 would be removed from the flow of the process.

Figure 3A:
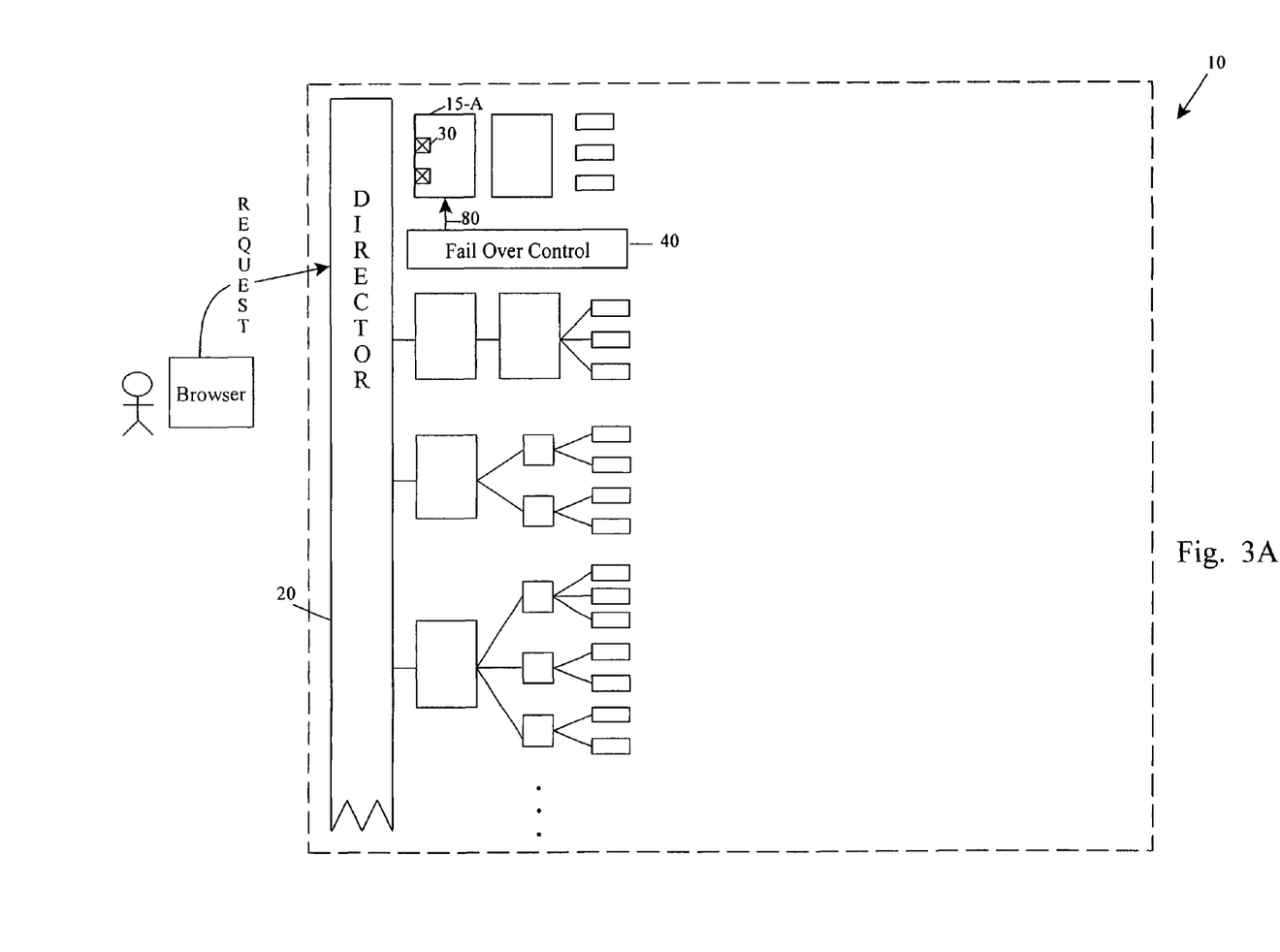
FIGS. 3A-3E are sequential diagrammatic views in accordance with the present invention corresponding to one embodiment for controlling communication ports according to the representative method of the flow chart of FIG. 2.
Figure 3B:
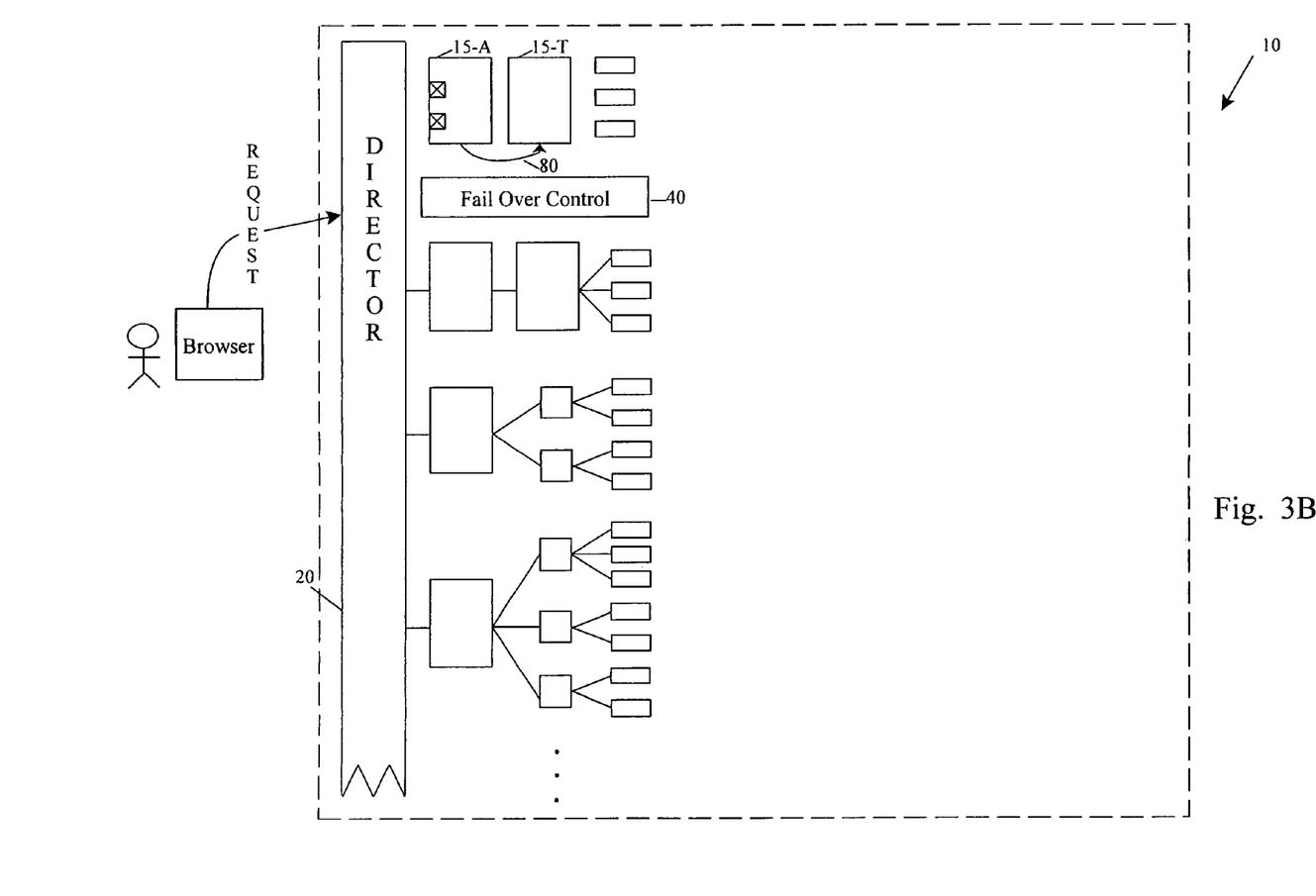
Figure 3C:
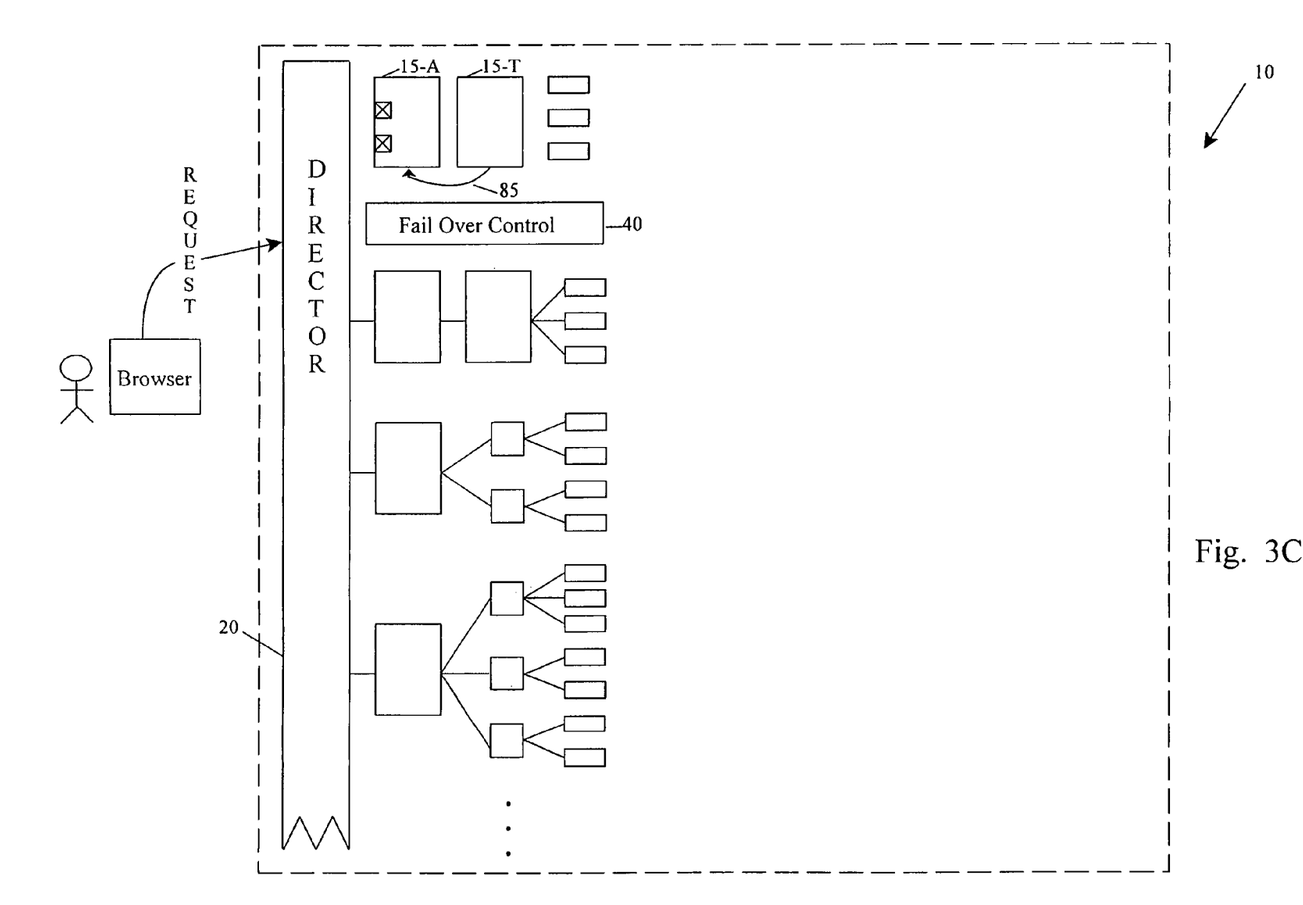
Figure 3D:
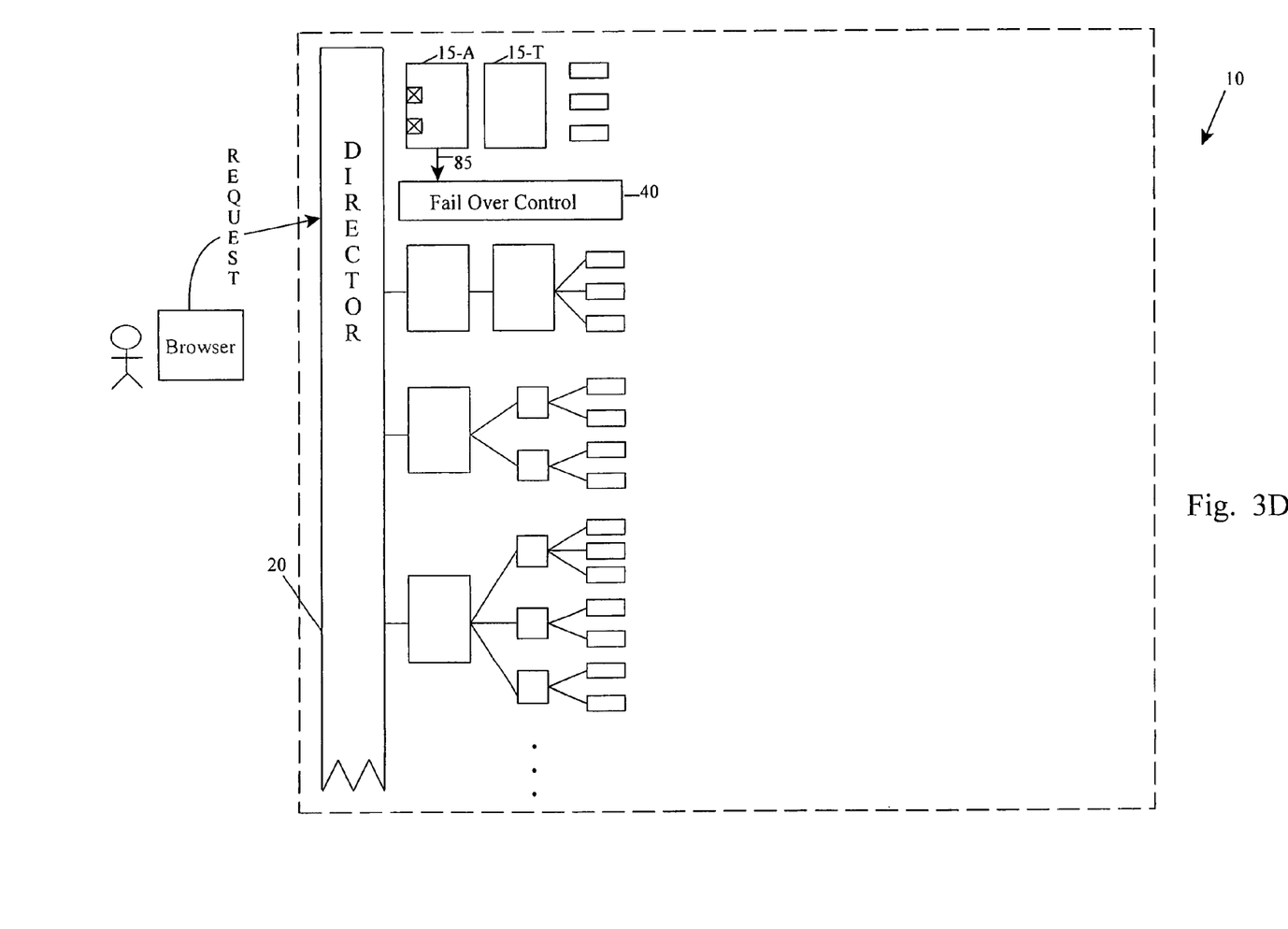

As an example of the flow chart 100 in combination with the computing environment 10, reference is taken to the FIGS. 3A-3E. In FIG. 3A, a policy has been established in the layers behind the director 20. Thereafter, a request 80 is sent or initiated from the fail over control 40 to the server or other computing device 15-A, located in the outermost layer. Again, the fail over can be part and parcel with any one or more devices of the computing environment 10 or separate. It is shown separate from 15-A herein, however, to illustrate the notion more clearly, but there is no requirement of same. To get the request 80 to a layer further away from the director 20, and thereby test an entire health of the service, FIG. 3B shows the server 15-A forwarding the request 80 to an intermediate device 15-T, such as a tomcat servlet engine. From there, FIG. 3C shows the engine 15-T providing a response 85 to the request and doing so by way of the intermediary server 15-A. In turn, the server 15-A gives the response to the fail over control in FIG. 3D whereby it is evaluated relative to predetermined or established policy. In this regard, if the request was representatively a quality of service check, and an acceptable rating was 80%, and the response given was a 95%, then policy would be deemed met. Conversely, if the response was a 79%, then policy would remain unmet, as previously described. Of course, other policies and responses are contemplated.

Figure 3E:
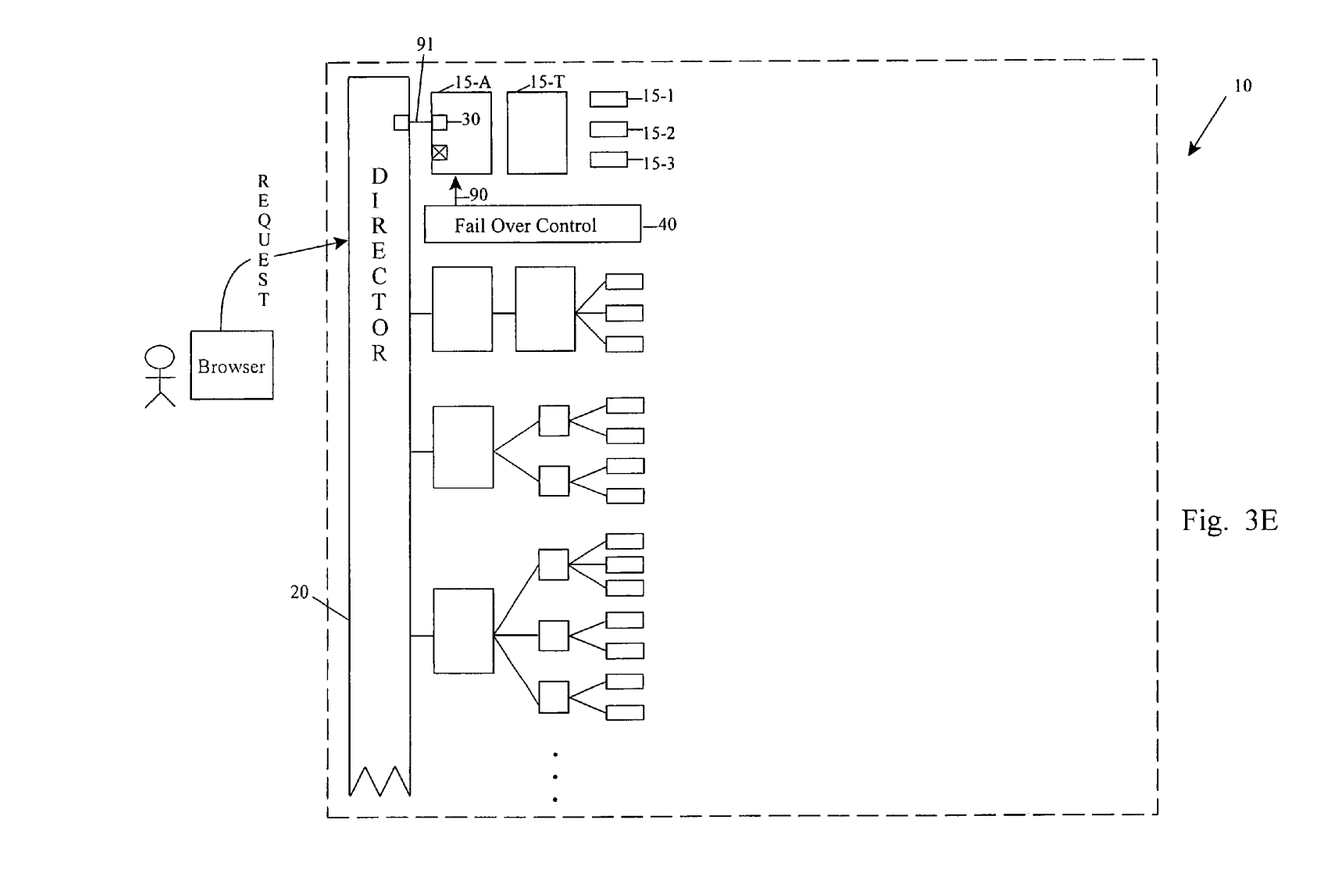

In FIG. 3E, if the policy is met, the fail over 40 informs 90 the computing device 15-A, that its otherwise un-enabled port 30 can be enabled (given by the lack of an X symbol in the square 30). Because typical directors are always assessing the viability of connected ports, the director itself now has an established line 91 of communication with the computing device 15-A. Because the computing device 15-A, in turn, further communicates with 15-T and 15-1, 15-2, 15-3, the director itself when sending traffic to port 30 is fairly assured that the health of the service is sufficient and requests directed from end users will be fulfilled as expected. Naturally, the reverse is also possible in that the port 30 could remain disabled or un-enabled to the extent the policy remained unmet by the response from the engine 15-T.

Figure 4A:
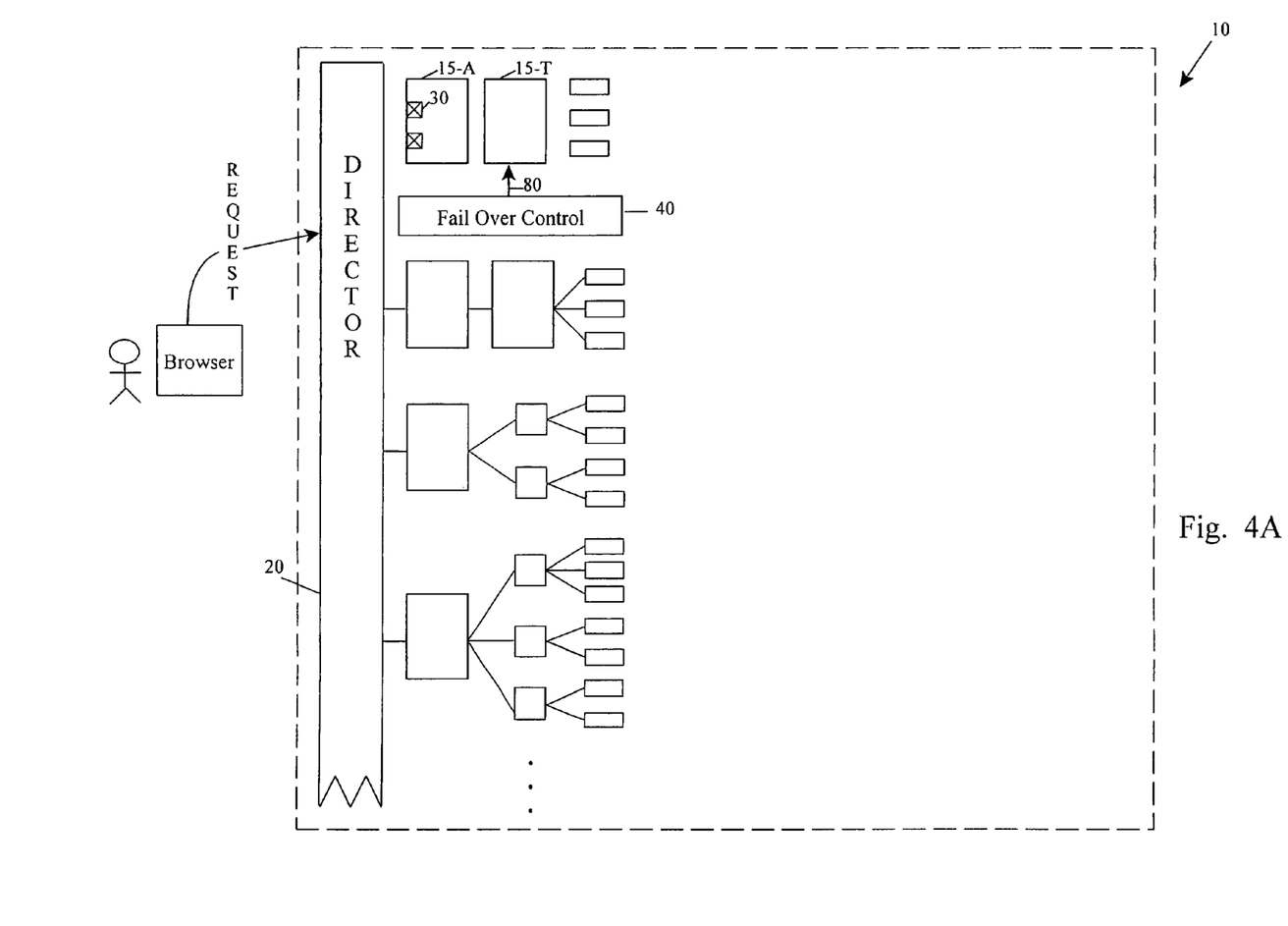
FIGS. 4A-4C' are sequential diagrammatic views in accordance with the present invention of an alternate embodiment for controlling communication ports according to the representative method of the flow chart of FIG. 2.
Figure 4B:
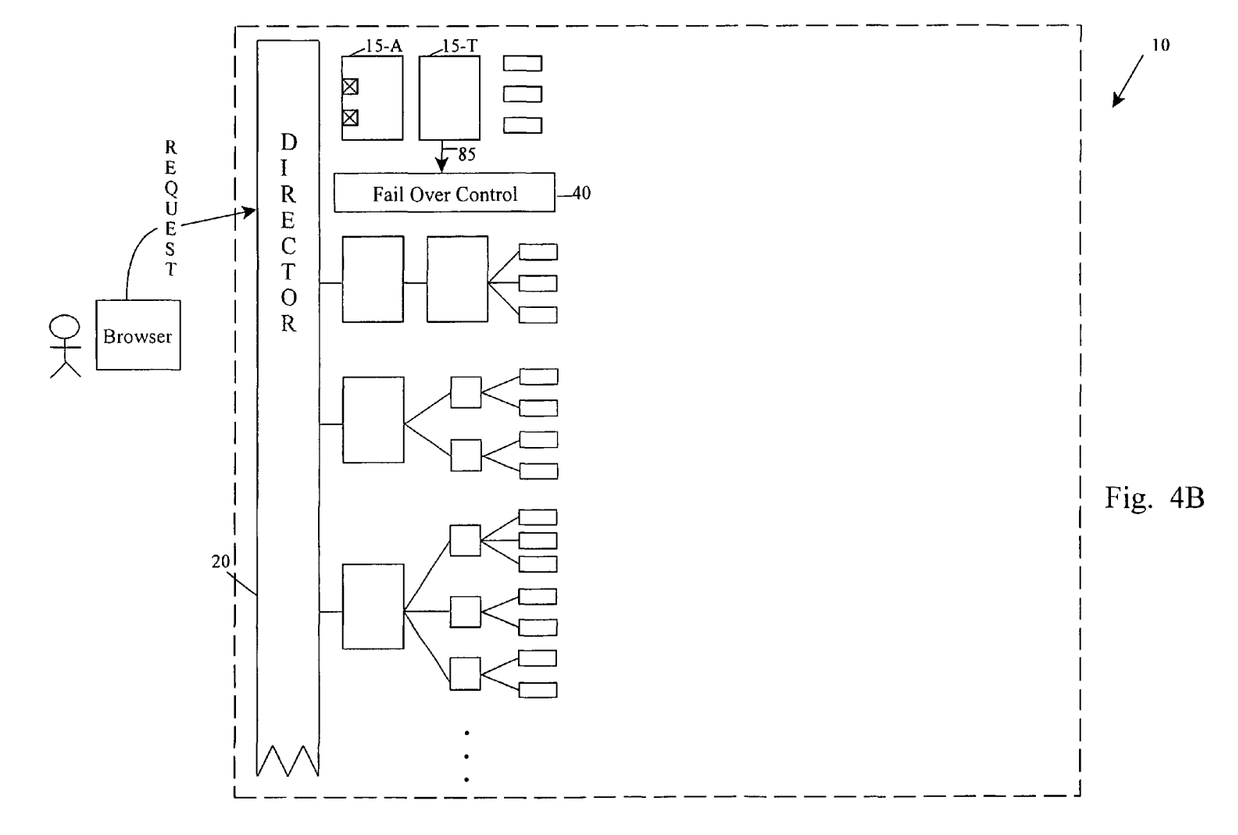

Appreciating various other ways of controlling communication ports with a fail over are possible and contemplated herein, FIGS. 4A-4C' show an alternate version. That is, FIG. 4A shows the fail over initiating or sending a request 80 directly to the intermediate device 15-T under consideration. In this manner, the server 15-A need not act as an intermediary. While this may seem trivial, it should be appreciated that many layers may exist behind the director 20 and the fewer intermediaries involved in determining policy to control ports may speed the process. It may also assist in troubleshooting. Namely, direct requests as compared to intermediary-directed requests may isolate which of the layers or which intermediary avoids meeting policy. Nonetheless, continuing the process occurs in FIG. 4B with a response 85 being returned directly from the intermediate device 15-T to the fail over.

Figure 4C:
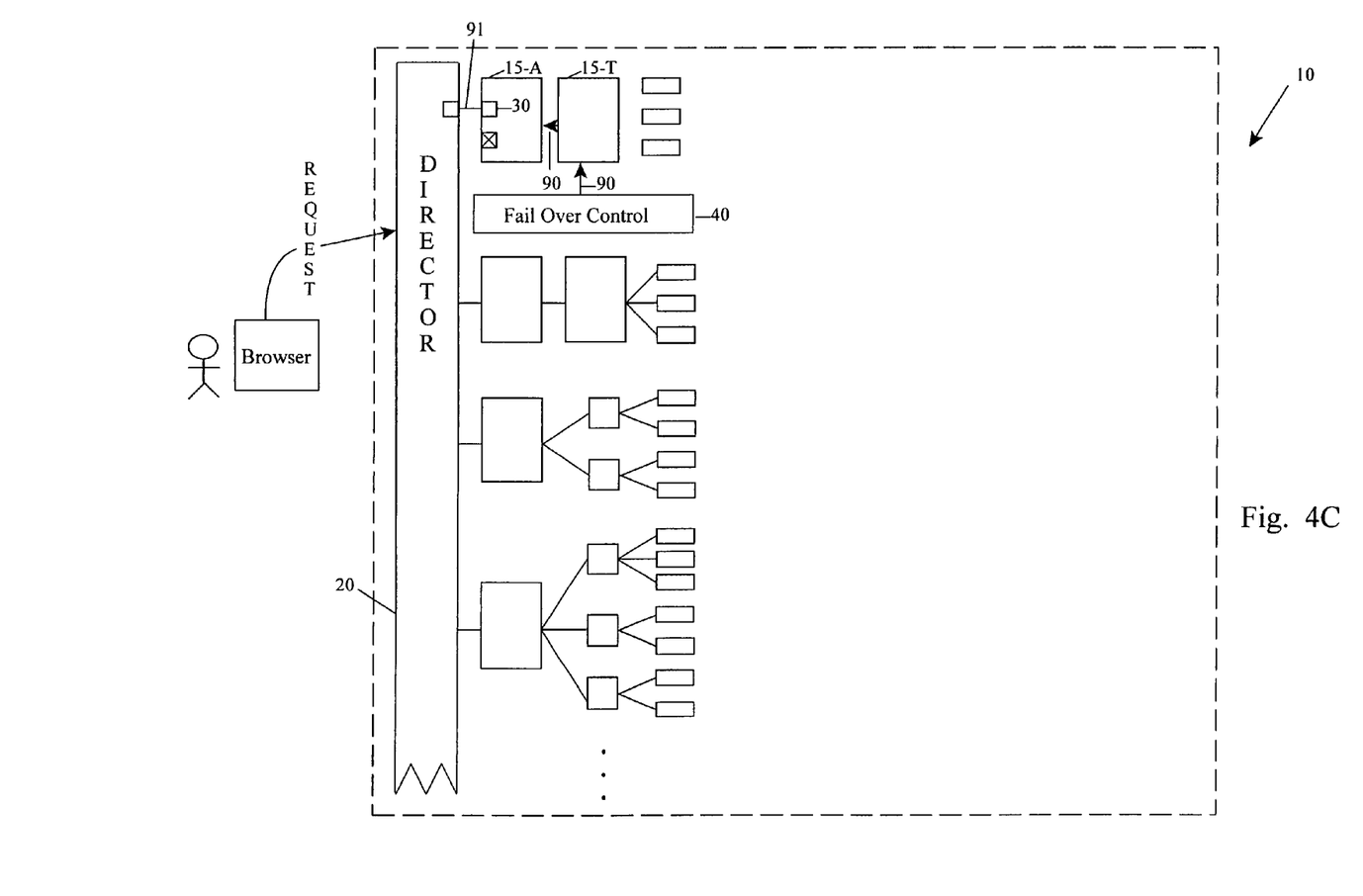

To the extent policy is then met, upon evaluating the response 85, FIG. 4C shows the enabling of port 30 for a direct line 91 of communications with the director upon 90 being forwarded to computing device 15-A. Alternatively, FIG. 4C' shows 90 being sent directly to computing device 15-A for enabling port 30, thereby bypassing the intermediary device 15-T. Of course, other alternatives should be readily apparent to skilled artisans at this time.

Ultimately, certain advantages of the invention over the prior art are readily apparent. For example, there is now methodology and topology to: 1) assess the health of services that functions deeper than just a check of interfaced ports; 2) enable ports or IP addresses by way of policy-based decisions; and 3) implement improvement over the art without reconfiguring or altering typical configurations of content flow directors, such as L4 switches. Naturally, skilled artisans will be able to identify still other advantages over the art.

One of ordinary skill in the art will also be able to recognize that additional embodiments are possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing system environment having a content flow director and multiple layers of computing devices behind the content flow director, wherein the computing devices in an outermost layer of the multiple layers communicate directly with the content flow director by way of attendant communications ports and the content flow director regularly assesses whether the ports are enabled or disabled, a method of controlling the communication ports of the computing devices established in the multiple layers, comprising:

establishing a policy behind the content flow director;

determining whether the policy is met or exceeded by interrogating at least one of the computing devices established in multiple layers behind the content flow director, wherein the determining includes interrogating another of the computing devices in a layer further away from the content flow director than the one of the computing devices in the outermost layer directly communicating with the content flow director; and enabling, based on whether the policy is met or exceeded, a port of one of the computing devices in the outermost layer, the content flow director detecting the enabling and allowing future communications between the content flow director and the one of the computing devices by way of the enabled port.

2. The method of claim 1, wherein the establishing the policy further includes installing executable code indicating predetermined acceptable criteria on at least one of the computing devices.

3. The method of claim 1, further including one of: (a) disabling an otherwise operable communications port between the one of the computing devices and the content flow director; and (b) preventing enabling the otherwise operable communications port between the one of the computing devices and the content flow director, if the policy is not met during the determining whether the policy is met or exceeded.

4. The method of claim 1, wherein the content flow director includes searching for the enabled port of the one of the computing devices.

5. The method of claim 1, further including iterating the determining whether the policy is met or exceeded.

6. In a computing system environment having a content flow director and multiple layers of computing devices behind the content flow director, wherein the computing devices in an outermost layer of the multiple layers communicate directly with the content flow director by way of a communication port, a method of controlling communication ports of the computing devices established in multiple layers, comprising:

establishing a policy behind the content flow director;

testing an operability of at least one of the computing devices established in multiple layers behind the content flow director based on the established policy by interrogating at least one of the computing devices, the testing including interrogating at least one of the computing devices existing in a layer of the multiple layers other than the outermost layer which directly communicates with the content flow director; and enabling a port of a computing device in the outermost layer of the multiple layers if the operability of the one of the computing devices is determined to be satisfactory, thereby allowing direct communications between the content flow director and the computing device by way of the enabled port.

7. The method of claim 6, wherein the testing the operability further includes determining a time of response, a quality of service check or a pass/fail condition of the one of the computing devices.

8. The method of claim 6, further including iterating the testing the operability of the one of the computing devices based on the established policy.

9. In a computing system environment having an L4 switch and multiple layers of computing devices behind the L4 switch, wherein a server in an outermost layer of the multiple layers communicates directly with the L4 switch by way of an attendant communications port and the L4 switch regularly assesses whether the attendant communications port is enabled or disabled, a method of controlling the attendant communications port of the server in the outermost layer, comprising:

establishing a policy in one or more of the computing devices behind the L4 switch;

ascertaining whether the policy is met or exceeded by interrogating at least one of the computing devices of the multiple layers of computing devices behind the L4 switch other than the server in the outermost layer directly communicating with the L4 switch; and enabling the attendant communications ports of the server in the outermost layer to become enabled if the policy is met or exceeded, the L4 switch detecting the enabling to allow future communications between the L4 switch and the server in the outermost layer by way of the attendant communications port.

10. The method of claim 9, wherein if the policy is unmet, one of disabling the enabled attendant communications port or preventing the attendant communications port from communicating with the L4 switch.

11. The method of claim 9, wherein the ascertaining whether the policy is met or exceeded further includes interrogating another of the computing devices in a layer other than the outermost layer.

12. The method of claim 11, wherein the interrogating another of the computing devices includes interrogating by way of the server in the outermost layer.

* * * * *